US008682361B2

(12) United States Patent  
Park et al.

(10) Patent No.: US 8,682,361 B2  
(45) Date of Patent: Mar. 25, 2014

(54) HOME NETWORK CONTROL APPARATUS, HOME NETWORK SERVICE SYSTEM USING HOME NETWORK CONTROL APPARATUS AND CONTROL METHOD THEREOF

(75) Inventors: Jung-bum Park, Seoul (KR); Ki-su Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1166 days.

(21) Appl. No.: 11/856,381

(22) Filed: Sep. 17, 2007

(65) Prior Publication Data

US 2008/0233983 A1    Sep. 25, 2008

(30) Foreign Application Priority Data

Mar. 20, 2007   (KR) .................. 10-2007-0027167

(51) Int. Cl.  
*H04W 4/00*   (2009.01)

(52) U.S. Cl.  
USPC ......................................... 455/466; 370/486

(58) Field of Classification Search  
USPC .................. 455/411, 419, 466; 713/171, 191; 380/279  
See application file for complete search history.

(56) References Cited

U.S. PATENT DOCUMENTS

2003/0078032 A1* 4/2003 Pei et al. ..................... 455/466  
2007/0130476 A1* 6/2007 Mohanty ...................... 713/191

FOREIGN PATENT DOCUMENTS

KR   2005-21695    3/2005  
KR   2005-78883    8/2005

* cited by examiner

*Primary Examiner* — Kashif Siddiqui  
(74) *Attorney, Agent, or Firm* — Stein IP, LLC

(57) ABSTRACT

A home network service system using an SMS service, the home network service system including: a text message processor to receive a text message; and a home network control apparatus to control a home network device according to the text message by converting a control signal corresponding to the text message using a protocol compatible with the home network device and transmitting the converted control signal to the home network device. Accordingly, various types of home network devices can be easily controlled.

24 Claims, 11 Drawing Sheets

| CMD | ENG | CHA | KOR |
|-----|-----|-----|-----|
| 082 | SEND | 轉送 | 보냄 |
| 105 | ACK | 確認 | 확인 |
| ... | | | |

HOME NETWORK CONTROL APPARATUS, HOME NETWORK SERVICE SYSTEM USING HOME NETWORK CONTROL APPARATUS AND CONTROL METHOD THEREOF

CROSS-REFERENCE TO RELATED APPLICATION

This application claims the benefit of Korean Application No. 2007-27167, filed Mar. 20, 2007 in the Korean Intellectual Property Office, the disclosure of which is incorporated herein by reference.

BACKGROUND OF THE INVENTION

1. Field of the Invention

Aspects of the present invention relate to a home network control apparatus, a home network service system using the home network control apparatus, and a control method thereof, and more particularly, to a home network control apparatus, a home network service system using the home network control apparatus and a control method thereof that can control a home network device using a text message service.

2. Description of the Related Art

Widely used constructions of home networks include: information networks that connect peripheral devices to personal computers (PCs); audio/video (A/V) networks that connect televisions (TVs) or digital set-top boxes and stereos; and home networks that connect air conditioners, refrigerators, or other home electronic appliances. Such home networking has become widespread as a result of the development of technologies relating to Internet access environments, shared peripheral devices, digital broadcasting, digital home electronic appliances, and the like. In order to implement such home networking, network constituents (such as in-home devices having computing capabilities, servers, computers, home appliance products, digital home electronic appliance, etc.) are required. For example, when a boiler is turned on, the boiler may be detected and operated by a digital signal transmitted from a PC. Accordingly, standardized home appliances (such as a digital TV, a digital camera, and a digital audio system) are required so as to be controlled in response to the digital signal, and to be operated in all network environments.

In order for a user to operate or control digital home electronic appliances (such as an air-conditioning and heating apparatus) using a PC or via the Internet, software and communication equipment may be needed to combine the PC with the digital home electronic appliances. The software and communication equipment is used to connect the PC to the home electronic appliances via a single network, and enable access and data exchange between home electronic appliances. Additionally, it is possible to directly access the Internet on all the computers in the home using the software and communication equipment.

Home networking technologies can be classified as wired networking technologies (performed using conventional telephone lines, network cables, coaxial cable lines, and/or power lines) or wireless networking technologies. Wireless networking technologies have become more popular recently as they allow greater mobility and flexibility without separate wires, and the structure can be easily changed.

Technologies for transmission among digital devices can be divided into wired and wireless home networking technologies. Wired home networking technologies include HomePNA, Ethernet, IEEE1394, power lines, and other related technologies. Wireless home networking technologies include Bluetooth, HomeRF, IrDA, wireless local area network (LAN), and similar technologies.

Such wired and wireless home networking technologies have been developed using a diverse range of methods. A simple control method that repeatedly turns a network on and off has been widely utilized using a public switched telephone network (PSTN) in order to control home electronic and information appliances in homes. Furthermore, architectures for mobile computers have been widely used as wireless home network systems with a wireless application protocol (WAP).

However, in a mobile portable terminal, a home network service in which a WAP server method is used is provided according to a bi-directional data packet transmission technique based on a code division multiple access (CDMA) system or a global system for mobile communication (GSM). Accordingly, accessing menus requires several steps, such as authentication by the WAP. Therefore, if a user must follow several steps to access a menu and view a screen corresponding to a device that the user wishes to operate, a long period of time may be required, and a large additional fee may be charged for transmitting the data packets.

Additionally, devices connected to the home network use different types of protocols according to the manufacturer, so a user interface suitable for each device must be developed individually in order to control the entire home network.

SUMMARY OF THE INVENTION

Aspects of the present invention provide a home network control apparatus, a home network service system using the home network control apparatus, and a control method thereof, in which a control signal corresponding to a text message is converted using a protocol compatible with a home network device so that the home network device can be controlled.

Additional aspects and/or advantages of the invention will be set forth in part in the description which follows and, in part, will be obvious from the description, or may be learned by practice of the invention.

According to an aspect of the present invention, there is provided a home network service system including: a text message processor to receive a text message; and a home network control apparatus to control a home network device according to the text message by converting a control signal corresponding to the text message using a protocol compatible with the home network device, and transmitting the converted control signal to the home network device.

According to an aspect of the present invention, the home network control apparatus may convert the control signal to correspond to command data matching the text message using the protocol compatible with the home network device, and the command data may be selected from prestored command data.

According to an aspect of the present invention, the home network device may include a receiver to receive the control signal corresponding to the command data matching the text message; and an operator to perform an operation on the home network device according to the received control signal.

According to an aspect of the present invention, the home network control apparatus may control the text message processor to send a response to the received text message.

According to an aspect of the present invention, the home network control apparatus may control the text message processor to transmit a text message command list to an external apparatus such that a user prepares the text message, to be transmitted to the text message processor, based on the text message command list.

According to an aspect of the present invention, wherein the text message command list includes at least one of a location entry, a device name entry, a key entry, and a setting value entry, such that the user prepares the text message to include a value for each entry.

According to another aspect of the present invention, there is provided a home network control apparatus to control a home network control device, the apparatus including: a storage unit to store command data matching a text message to control the home network device; and a protocol converter to check the command data for matching command data corresponding to a received text message, and to convert a control signal corresponding to the command data using a protocol compatible with the home network device.

According to an aspect of the present invention, the home network control apparatus may further include a communication unit to transmit the control signal converted by the protocol converter to the home network device.

According to an aspect of the present invention, the communication unit may receive data relating to a status of a control operation performed according to the control signal from the home network device, and may inform the external apparatus of the status.

According to an aspect of the present invention, the storage unit may store command data matching a text message written using at least one language.

According to another aspect of the present invention, there is provided a text message transceiver to transmit and receive a text message to control a home network device, the text message transceiver including: a program download unit to download a home network control program; a user interface (UI) provider to provide a UI to control a home network device using the home network control program; and a text message generator to generate a text message to control the home network device according to a control command input through the UI.

According to another aspect of the present invention, there is provided a home network service method including: receiving a text message to control a home network device from a text message transceiver; converting a control signal corresponding to the text message using a protocol compatible with the home network device; and transmitting the converted control signal to the home network device.

According to an aspect of the present invention, the converting of the control signal may include converting the control signal corresponding to command data matching the text message using a protocol compatible with the home network device, wherein the command data may be selected from prestored command data.

According to an aspect of the present invention, the home network service method may further include: receiving, in the home network device, the control signal corresponding to the command data matching the text message; and performing an operation according to the received control signal.

According to an aspect of the present invention, the home network service method may further include transmitting a text message command list to the text message transceiver.

According to an aspect of the present invention, the home network service method may further include receiving, from the home network device, data relating to a status of a control operation performed according to the control signal, and transmitting the status to the text message transceiver.

According to another aspect of the present invention, there is provided a method of controlling a home network device with a text message transceiver, the method including: downloading a home network control program from an external apparatus; providing a UI to control the home network device using the stored home network control program; and generating a text message to control the home network device according to a control command input through the UI.

According to an aspect of the present invention, the method may further include transmitting the generated text message to a home network control apparatus connected to the home network device.

According to yet another aspect of the present invention, there is provided a text message transceiver to control a home network device, the text message transceiver including: a user interface (UI) provider to provide a UI to receive a user input to control the home network device; a text message generator to generate a text message to control the home network device according to the user input; and a communication unit to transmit the text message to a home network service system of the home network device, wherein the home network service system converts a control signal corresponding to the text message using a protocol compatible with the home network device, and transmits the converted control signal to the home network device.

According to still another aspect of the present invention, there is provided a method of controlling a home network control device, the method including: storing command data to control the home network device; checking the stored command data for matching command data that corresponds to a text message received from an external apparatus; and converting a control signal corresponding to the matching command data using a protocol compatible with the home network device.

According to another aspect of the present invention, there is provided a method of controlling a home network device with a text message transceiver, the method including: receiving a user input in the text message transceiver to control the home network device; generating a text message according to the user input; transmitting the generated text message to a home network control apparatus; converting a control signal corresponding to the text message using a protocol compatible with the home network device; and transmitting the converted control signal to the home network device.

According to yet another aspect of the present invention, there is provided a system for controlling a home network device with a text message, the system including: a text message transceiver including: a user interface (UI) provider to provide a UI to receive a user input to control the home network device, a text message generator to generate a text message to control the home network device according to the user input, and a communication unit to transmit the text message; and a home network service system connected to the home network device, the apparatus including: a text message processor to receive the text message, and a home network control apparatus to control the home network device according to the text message by converting a control signal corresponding to the text message using a protocol compatible with the home network device and transmitting the converted control signal to the home network device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
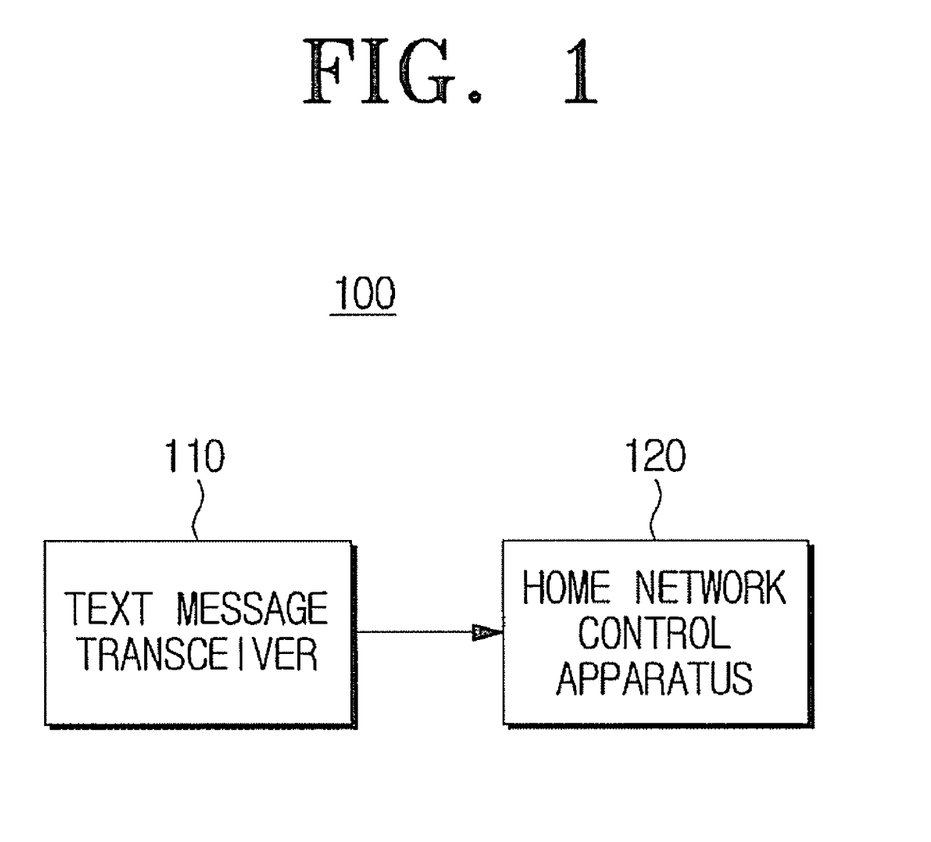
FIG. 1 is a block diagram of a home network service system according to an embodiment of the present invention.

FIG. 1 is a block diagram of a home network service system 100 according to an embodiment of the present invention. In FIG. 1, the home network service system 100 includes a text message processor 110 and a home network control apparatus 120.

The text message processor 110 receives a text message from a text message transceiver (not illustrated), such as a mobile phone, and processes the received message. While not limited thereto, the text message processor 110 may be implemented as a code division multiple access (CDMA) modem capable of directly receiving mobile phone text messages, a short message service (SMS) corresponding to CDMA, or as a system (such as a server) in which content relating to the SMS service is contained. Further, the text message may be created as a short message of text compatible with SMS or instant messaging (IM).

The home network control apparatus 120 converts a control signal corresponding to a text message using or according to a protocol compatible with a home network device, and operates the home network device in response to the converted control signal. Home network devices (i.e., devices in the home network) may use different protocols according to, for example, a manufacturer. Accordingly, the conversion of the control signal using the compatible protocol may be performed in order to operate the home network device.

The home network control apparatus 120 may also transmit a preset text message command list to the text message transceiver (not illustrated). Accordingly, a user may prepare a text message to control the home network device using the text message command list transmitted from the home network control apparatus 120 to the text message transceiver (not illustrated). While shown as separate, it is understood that the processor 110 and the apparatus 120 can be integrated into a single unit, or can be merely connected using wired and/or wireless techniques.

Figure 2:
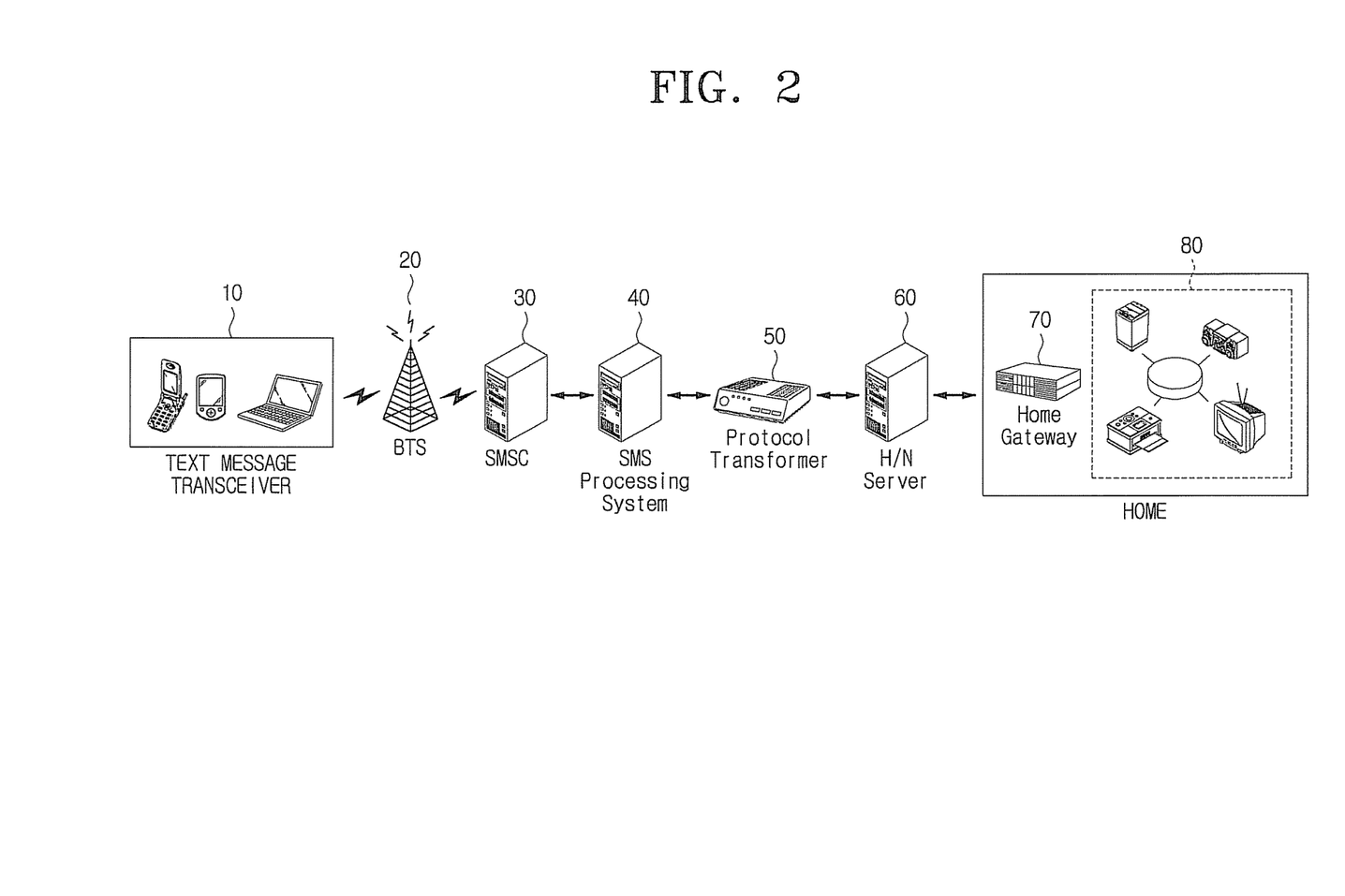
FIG. 2 is a detailed view explaining the home network service system of FIG. 1

FIG. 2 is a detailed view explaining the home network service system of FIG. 1. In FIG. 2, the home network service system 100 includes a text message transceiver 10, a base station system (BTS) 20, a short message service center (SMSC) 30, an SMS processing system 40, a protocol transformer 50, a home network (H/N) server 60, a home gateway 70, and a home network device 80. The home network control apparatus 120 of FIG. 1 may be implemented as at least one of the protocol transformer 50, the H/N server 60, the home gateway 70, or combinations thereof. The text message processor 110 may be implemented as the SMS processing system 40. However, it is understood that aspects of the present invention are not limited thereto. For example, the home network control apparatus 120 may also be implemented as the SMS processing system 40.

The text message transceiver 10 is any device capable of preparing and transmitting a text message. The text message transceiver 10 may, although not necessarily, be a portable or mobile device. Furthermore, the text message transceiver may, although not necessarily, be capable of receiving messages from another text message transceiver 10. Examples of the text message transceiver 10 include a mobile phone, a personal digital assistant (PDA), a personal communication system (PCS), a laptop computer equipped with a wireless LAN, a navigator, etc. However, it is understood that non-portable devices, such as a computer, can be adapted to send text messages.

The BTS 20 wirelessly communicates with a mobile station (MS), such as the transceiver 10, in a cell to provide a mobile communication service to a subscriber. Additionally, the BTS 20 may adjust the power level of a transmitted or received signal, evaluate the quality of the upstream link, provide space diversity, manage radio resources, and maintain characteristics thereof, in order to more economically provide a high-quality telephone service and SMS service. However, when the transceiver 10 is not the mobile device or the text message is being sent over a non-wireless network, the BTS 20 need not be used.

The SMSC 30 extracts information relating to a sender's number, a receiver's number, and/or information on service costs. Furthermore, the SMSC 30 extracts the information from a text message for a designated number, transmits the extracted information to a service provider, and sends the text message for the designated number to a designated number provider. The service cost data may be different according to the designated number provider.

The SMS processing system (SMSC) 40 performs a mobile originated (MO) service. The MO service is a person to machine (P2M) service that transmits an SMS message sent from the transceiver 10 (such as a mobile phone) to a server or a PC (such as the server 60) corresponding to or attached to a specific number, and receives a message from the server online or in another medium showing the data in the original format or in another format.

The protocol transformer 50 converts a control signal corresponding to the text message sent from the SMSC 40 using a protocol compatible with the home network device 80. The protocol transformer 50 may be implemented as an application or service that may be provided on the protocol transformer 50, the H/N server 60, or the home gateway 70. However, it is understood that aspects of the present invention are not limited thereto. For example, the protocol transformer 50 may be implemented in a system as a server in which the protocol transformer 50 may be independently equipped.

The H/N server 60 receives the converted control signal from the protocol transformer 50, and the text message and the information relating to the receiver's number from the SMSC 40, and the H/N server 60 determines whether the received number is registered to determine if the text message was sent from an authorized user of the home network device 80 being controlled. It is understood that the control can be for all types of appliances in the home, or for selected appliances based upon the receiver's number. The H/N server 60 may also analyze and extract a control portion of a text message representing home network information from the received text message using a language analyzer to control the home network device 80 used in a corresponding home through the home gateway 70.

The home gateway 70 enables the flow of control operation information, received from the protocol transformer 50 via the H/N server 60, to control the home network device 80. Furthermore, the home gateway 70 may receive operation information relating to operation completion of the home network device 80 and sends the information to the H/N server 60.

The home network device 80 recognizes the control operation information received through the home gateway 70, and operates according to the control information. Furthermore, the home network device 80 may be equipped with a wireless module for wireless communication. However, it is understood that aspects of the present invention are not limited thereto. For example, the home network device 80 may be equipped with a wired module for wired communication (for example, through an IEEE 1394 or Ethernet home network). Additionally, after completion of the operation, the home network device 80 may send a text message or predetermined data signal to inform the home gateway 70 of the operation completion. However, it is understood that the home network device 80 may transmit operation information in other ways, according to aspects of the present invention. For example, the home network device 80 may transmit the text message or predetermined data signal only if an operation is not completed within a predetermined period of time. While described as a single device 80, it is understood that the device 80 can be a selected device 80 among multiple appliances capable of receiving commands from the home gateway 70. Further, it is understood that the appliance can be multiple types of appliances, such as kitchen appliances, audio/visual appliances, printers, displays, or other like devices.

Figure 3:
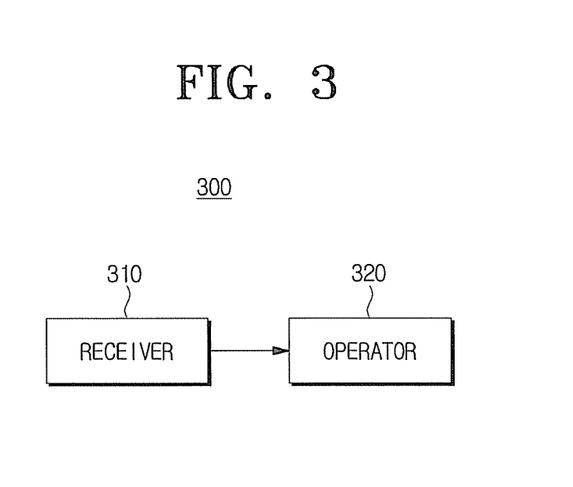
FIG. 3 is a detailed block diagram of a home network device according to an embodiment of the present invention.

FIG. 3 is a detailed block diagram of a home network device 300 according to an embodiment of the present invention. Referring to FIG. 3, the home network device 300 includes a receiver 310 and an operator 320. The receiver 310 receives a control signal corresponding to command data of the text message, and the operator 320 performs an operation according to the control signal received by the receiver 310. An example of the device 300 is the appliance 80. The receiver 310 can be incorporated into the device 300 as shown, or can be detachably connected to the operator 320.

Figure 4:
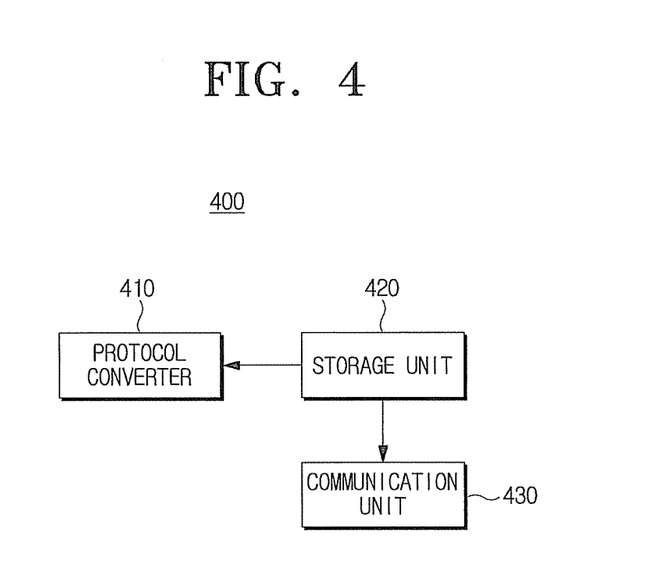
FIG. 4 is a block diagram of a home network control apparatus according to an embodiment of the present invention.

FIG. 4 is a block diagram of a home network control apparatus 400 according to an embodiment of the present invention. Referring to FIG. 4, the home network control apparatus 400 includes a storage unit 410, a protocol converter 420, and a communication unit 430. The storage unit 410 stores the command data corresponding to the text message to control the home network device 300. Specifically, the storage unit 410 may store main command data and sub-command data in order to control the home network device 300. Additionally, the storage unit 410 may store registration number data that is used to determine whether a corresponding number of a text message transceiver is registered in the home network control apparatus 400. The storage unit 410 may store or generate operation completion message data and/or error message data that is used according to whether a registered number exists. The error message data may be a text message transmitted from a text message transceiver.

The protocol converter 420 matches the text message transmitted from the text message transceiver to the command data stored in the storage unit 410, and converts the control signal corresponding to the matched command data using a protocol that is recognized by a corresponding home network device 300.

The communication unit 430 transmits the control signal converted by the protocol converter 420 to the corresponding device. The communication unit 430 may be implemented as one or more of a web service manager, a socket communicator, a hypertext transfer protocol (HTTP) communicator, an interprocess communication (IPC), a shared memory, a static library, etc. Additionally, the communication unit 430 may inform the text message transceiver (not shown) of processes for operating the home network control apparatus 400 and of successive operation states of the home network device.

Figure 5A:
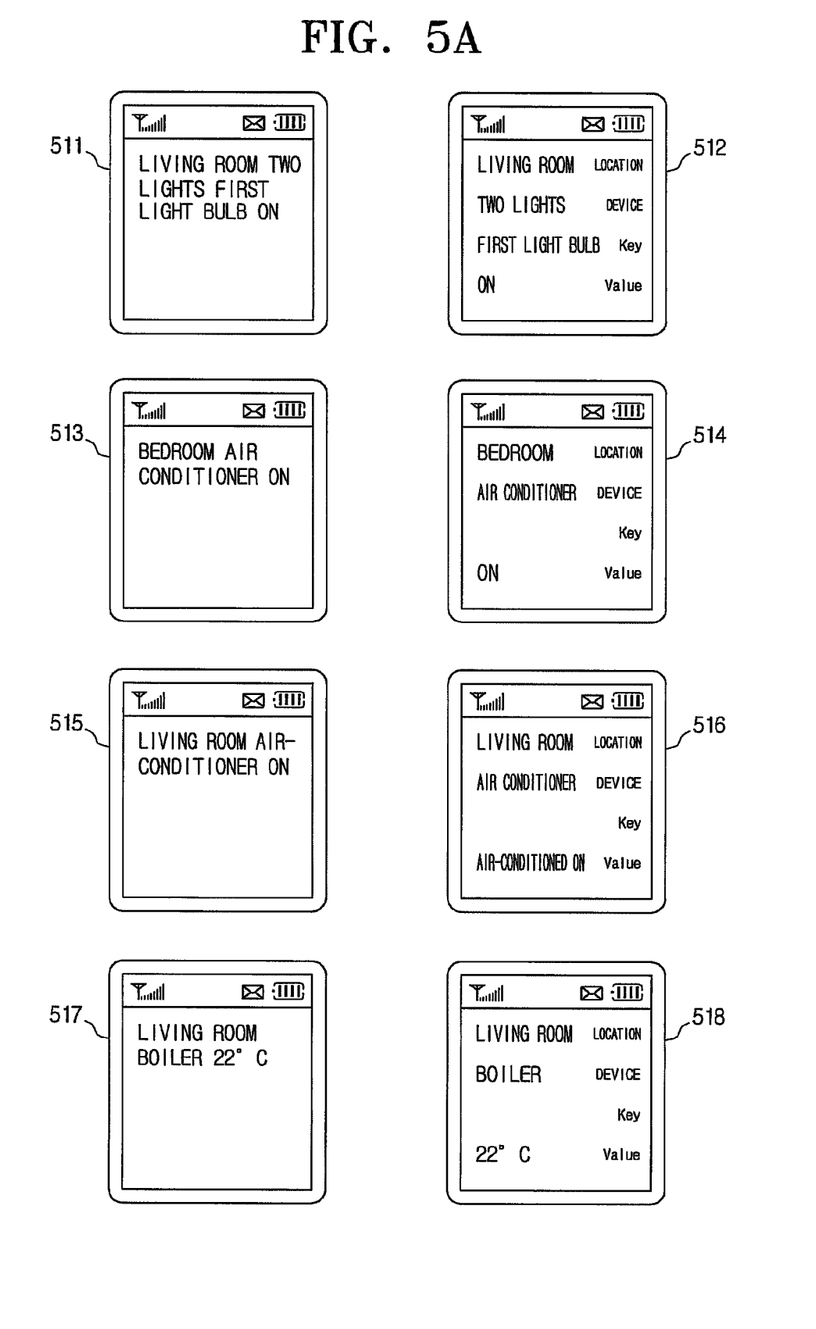
FIGS. 5A and 5B are views illustrating text messages written in order to control or inquire about a home network device.
Figure 5B:
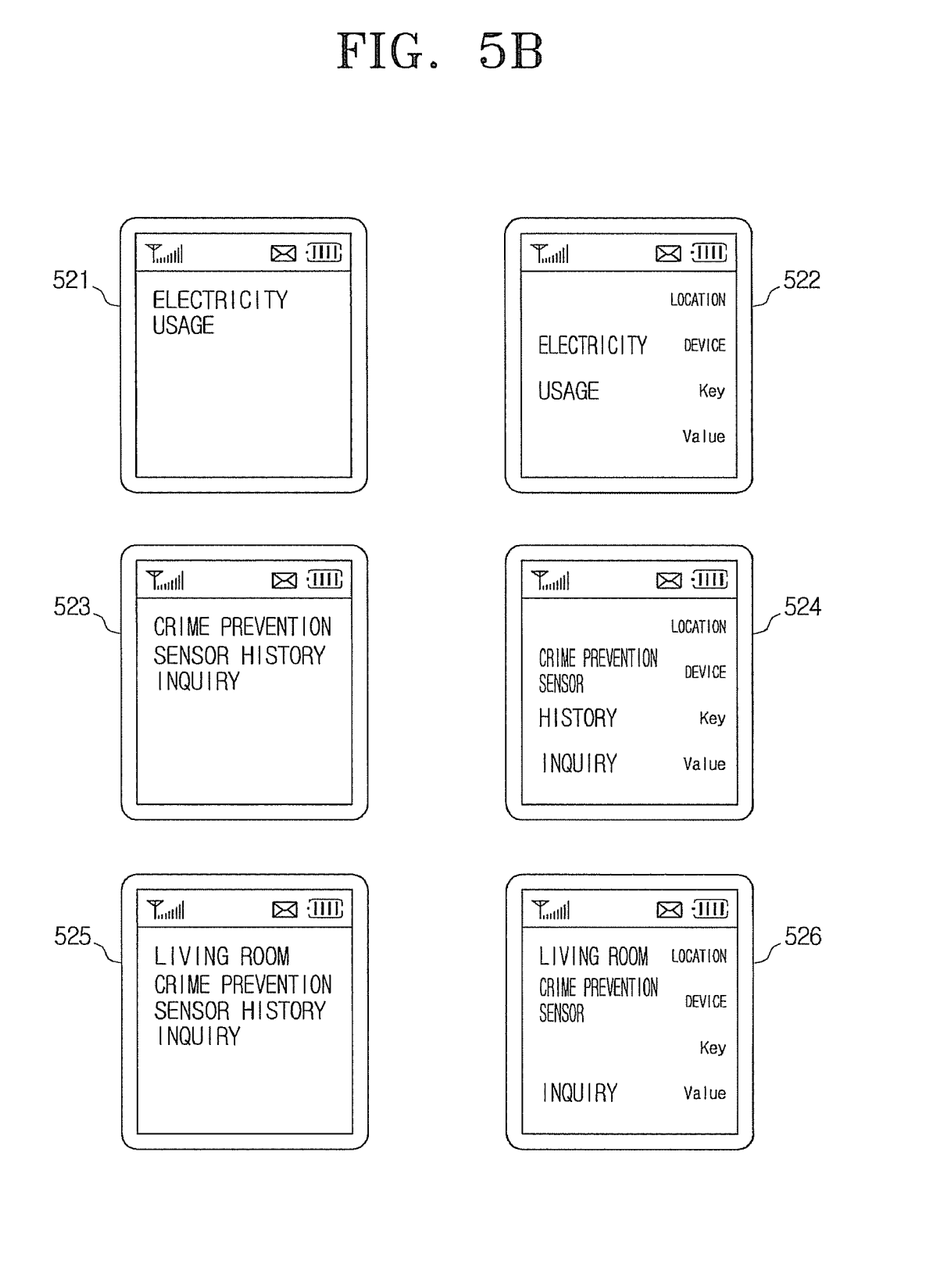

FIGS. 5A and 5B are views illustrating text messages written in order to control or inquire about a selected home network device 300 as displayed on a display of a mobile phone. Referring to FIG. 5A, a text message to control the home network device includes a location of a corresponding home network device 300, a name of the corresponding home network device 300, a key, and a setting value. However, the display can have fewer or additional items.

For example, a text message in a first format 511 of (living room, two lights, first light bulb, on) may be input, or content matching a second format 512 of (location, device name, key, value) may be input using a preset text message format. Additionally, if text messages 513 and 514 that are previously received from the home network control apparatus 400 are used, only specific items may have be changed. Accordingly, the changed text messages may be written as illustrated in text messages 515 and 516 (for example, "bedroom" of the text messages 513 and 514 is changed to "living room" of the text messages 515 and 516). Furthermore, it is possible to write text messages 517 and 518 by omitting a specific item (for example, omitting a key value). In this situation, the stored data may be retrieved and parsed to verify that the key value (for example, "temperature setting") is omitted. The examples given above describe a situation in which a single device 300 is controlled. However, it is understood that aspects of the present invention are not limited thereto. Accordingly, if two or more devices are controlled, two or more control commands may be written in a single text message.

Referring to FIG. 5B, on a text message display screen of the text message transceiver, content matching a location of a corresponding home network device 300 and a name of the corresponding home network device 300 may be written, and content regarding a corresponding home network device 300 that is to be inquired about may be written as a main command and a sub-command.

If text messages 521 and 522 are written in a third format of (electricity, usage), data in the text messages may be parsed to verify that the location "all" and a key value "inquiry" are omitted.

If text messages 523 and 524 are written in a fourth format of (crime prevention sensor, history, inquiry), data in the text messages may be parsed to verify that the location "all" is omitted. Additionally, if text messages 525 and 526 are written in a fifth format of (living room, crime prevention sensor, inquiry), data in the text messages may be parsed to verify that a key value, "in operation," is omitted.

Figure 6A:
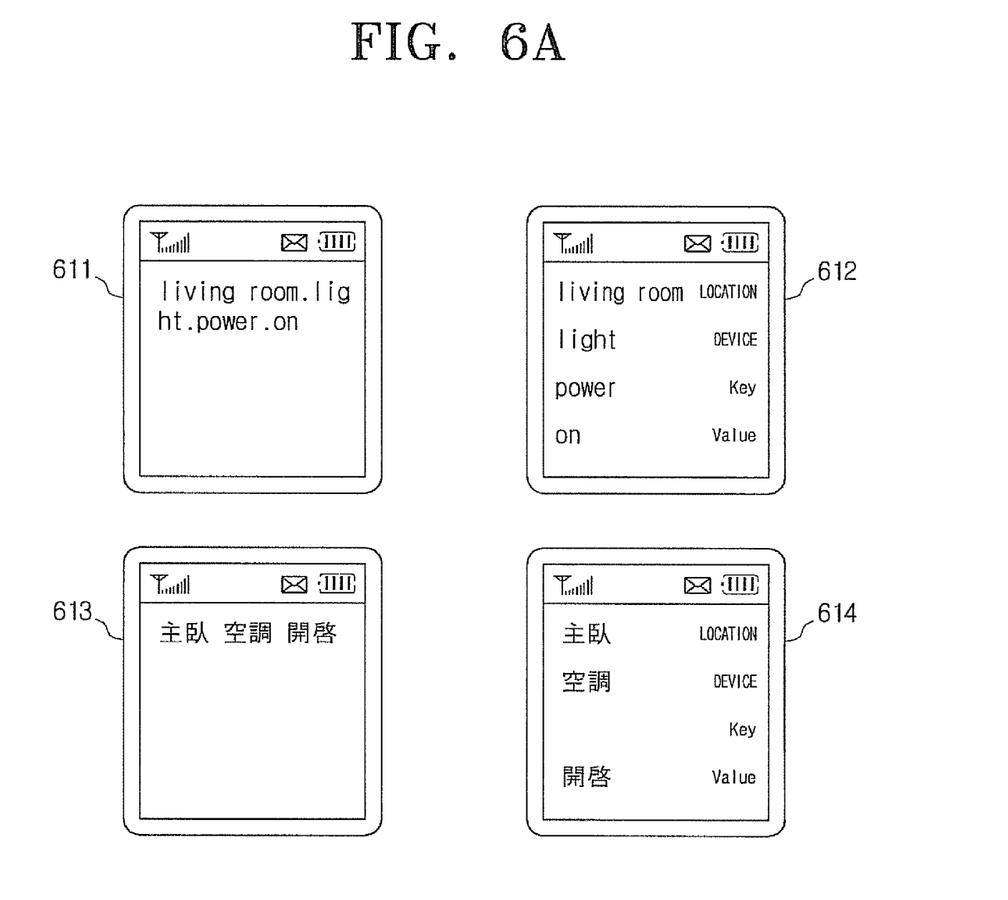
FIGS. 6A and 6B are views respectively illustrating examples of text messages in various languages and an example command data content that has previously been stored.
Figure 6B:
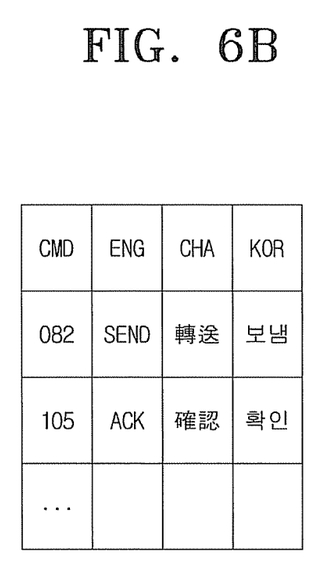

FIG. 6A is a view illustrating text messages written using various languages, and FIG. 6B is a view illustrating content provided in response to command data that has previously been stored. As illustrated in FIG. 6A, text messages 611 and 612 are written using English, and text messages 613 and 614 are written using Chinese. FIG. 6B illustrates content provided in response to command data for each language, including English, Chinese, and Korean with corresponding command numbers.

Figure 7:
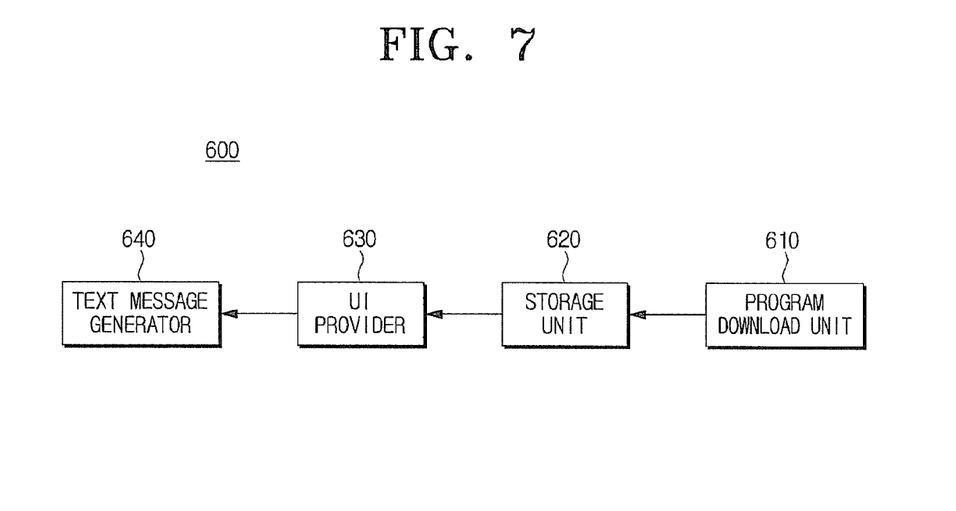
FIG. 7 is a block diagram of a text message transceiver according to another embodiment of the present invention.

FIG. 7 is a block diagram of a text message transceiver according to another embodiment of the present invention. Referring to FIG. 7, a text message transceiver 600 includes a program download unit 610, a storage unit 620, a user interface (UI) provider 630, and a text message generator 640.

The program download unit 610 downloads a home network control program from an external apparatus. The storage unit 620 stores the home network control program. The UI provider 630 provides a UI to control a home network device 300 using the home network control program stored in the storage unit 620. According to an aspect of the present invention, the home network control program includes information on the home network device 300, such that the UI provider provides the UI according to the information 630. Further, the program can be written using languages compatible with mobile phones, such as J2ME and BREW.

The text message generator 640 generates a text message according to a control command that is input through the UI. For example, if a user inputs or requests that an air conditioner be turned off through a displayed screen, a message may be automatically generated in a format corresponding to the user's selection, and the generated message may be transmitted to the home network control apparatus 400.

Figure 8:
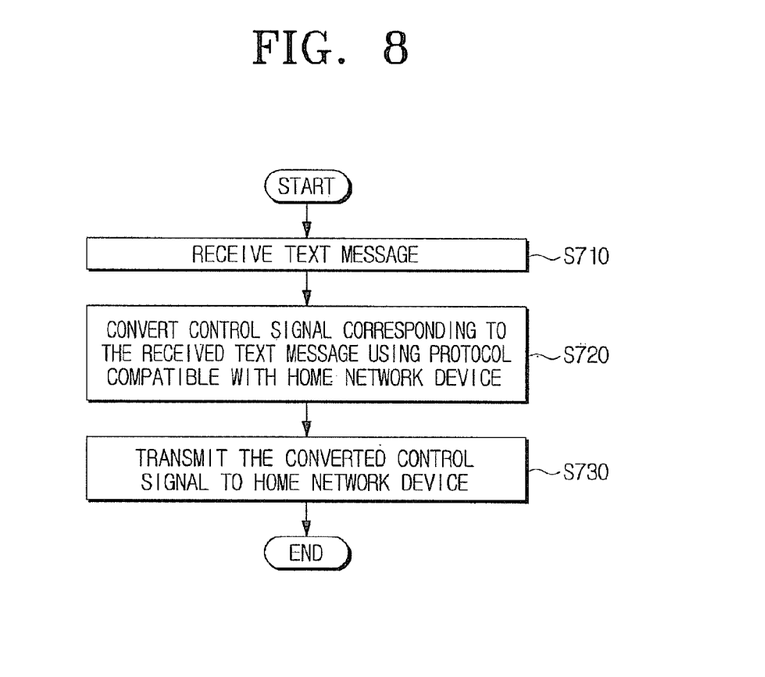
FIG. 8 is a flowchart describing a home network service method according to an embodiment of the present invention.

FIG. 8 is a flowchart describing a home network service method according to an embodiment of the present invention. Referring to FIG. 8, a text message to control a home network device 80 is received from a text message processor 110 in operation S710. Then, a control signal corresponding to the received text message is converted using a protocol compatible with the home network device 80 in operation S720. Subsequently, the converted control signal is transmitted to the home network device 80 in operation S730.

Figure 9A:
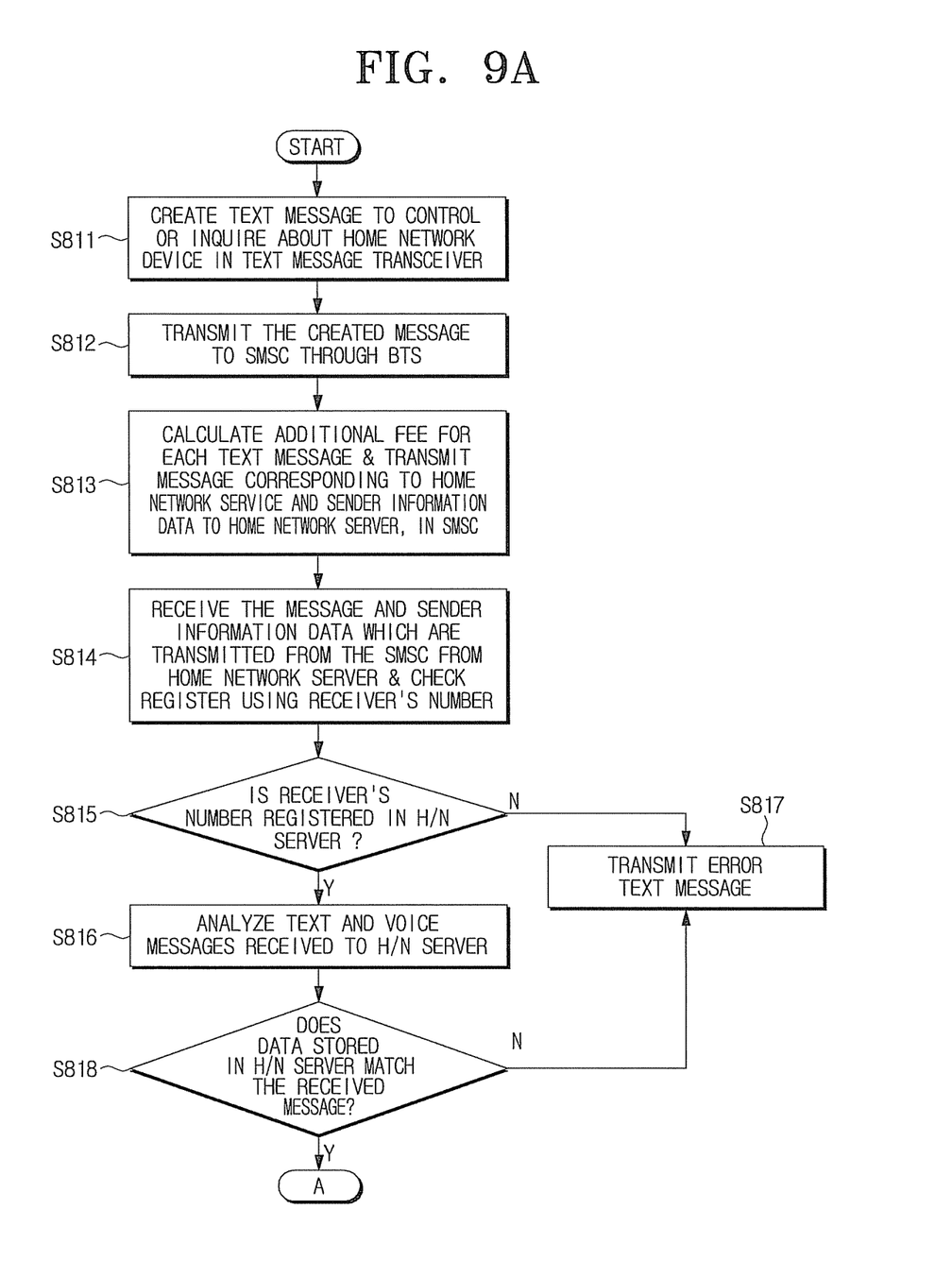
FIGS. 9A and 9B are flowcharts describing a more particular example of the home network service method of FIG. 8.
Figure 9B:
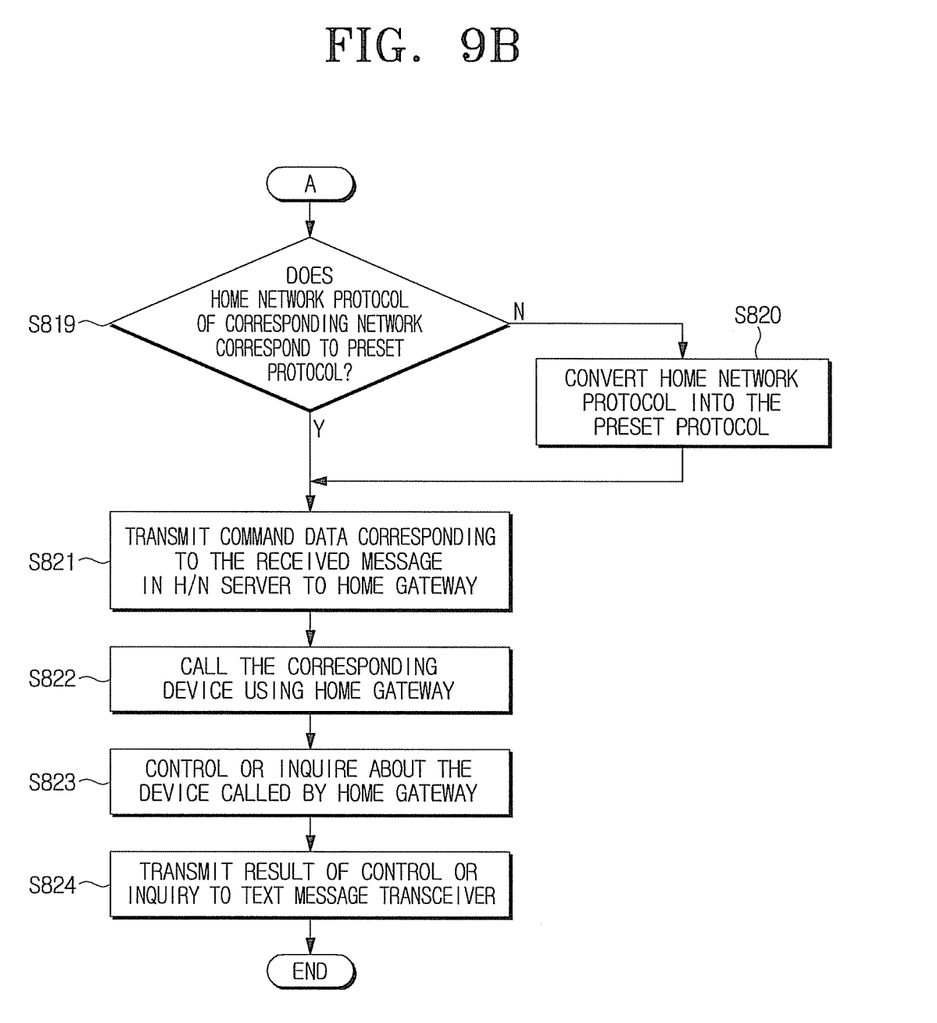

FIGS. 9A and 9B are flowcharts describing a more particular example of the home network service method of FIG. 8. Referring to FIGS. 9A and 9B, a text message to control or inquire about a home network device is created through a text message transceiver 10 in operation S811. The created message is then transmitted to an SMSC 30 through a BTS 20 in operation S812. In the SMSC 30, an additional fee for each text message is calculated and sender information data and a message corresponding to the home network service is transmitted to a home network server 60 in operation S813. It is understood that, according to other aspects, the SMSC 30 does not calculate an additional fee for each text message. The home network server checks a registration number using the message and sender information data that are transmitted from the SMSC 40 in operation S814.

If the receiver's number provided in the sender information data is registered in the H/N server 60 (operation S815-Y), the text message (and/or voice message) received by the H/N server 60 is analyzed in operation S816. In contrast, if the receiver's number provided in the sender information data is not registered in the H/N server 60 (operation S815-N), an error text message is transmitted in operation S817. However, it is understood that according to other aspects, no error message is transmitted, a request for a re-transmittal of the text message is transmitted, and/or the requested service is just not performed.

According to the analysis of the text message (operation S816), if the data stored in the H/N server 60 matches the received message (operation S818-Y), it is determined whether a home network protocol of a corresponding network corresponds to a preset protocol in operation S819. In contrast, if the data stored in the H/N server does not match the received message (operation S818-N), an error text message is transmitted in operation S817. However, it is understood that according to other aspects, no error message is transmitted, a request for a re-transmittal of the text message is transmitted, and/or the requested service is just not performed.

If the home network protocol corresponds to the preset protocol (operation S819-Y), command data corresponding to the received message in the H/N server 60 is transmitted to a home gateway 70 in operation S821. However, if the home network protocol does not correspond to the preset protocol (operation S819-N), the home network protocol is converted into the preset protocol (such as using the protocol transformer 50) in operation S820. Then, the command data corresponding to the received message in the H/N server 60 is transmitted to the home gateway 70 in operation S821.

Next, the home gateway 70 calls the corresponding home network device 80 in operation S822, and controls or inquires about the device 80 according to the command data in S823. The result or an operation status of the controlling or the inquiring may then be sent to the text message transceiver 10 in operation S824.

Figure 10:
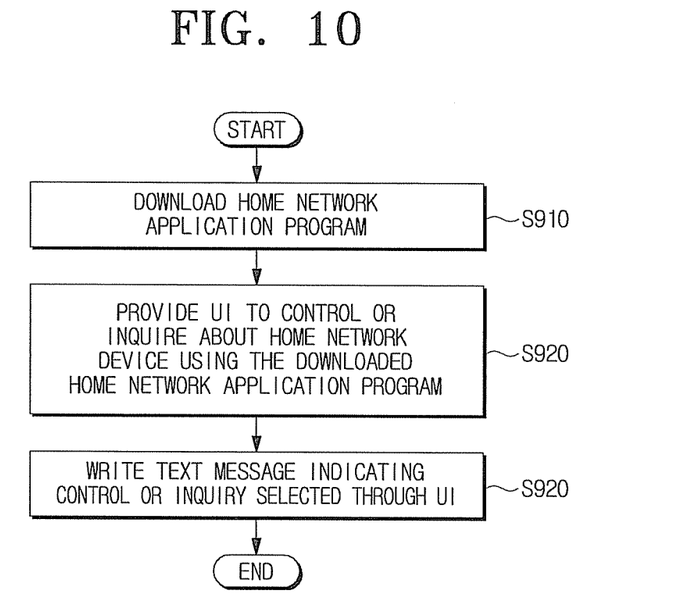
FIG. 10 is a flowchart describing a method of writing a text message in a text message transceiver, according to an embodiment of the present invention.

FIG. 10 is a flowchart describing a method of writing a text message in a text message transceiver 10 according to an embodiment of the present invention. Referring to FIG. 10, first, the text message transceiver 10 downloads a home network application program in operation S910. Then, a UI is provided to control or inquire about a device in the home network using the downloaded home network application program in operation S920. Next, a text message indicating a control operation or an inquiry operation selected through the UI is written in operation S930.

Figure 11:
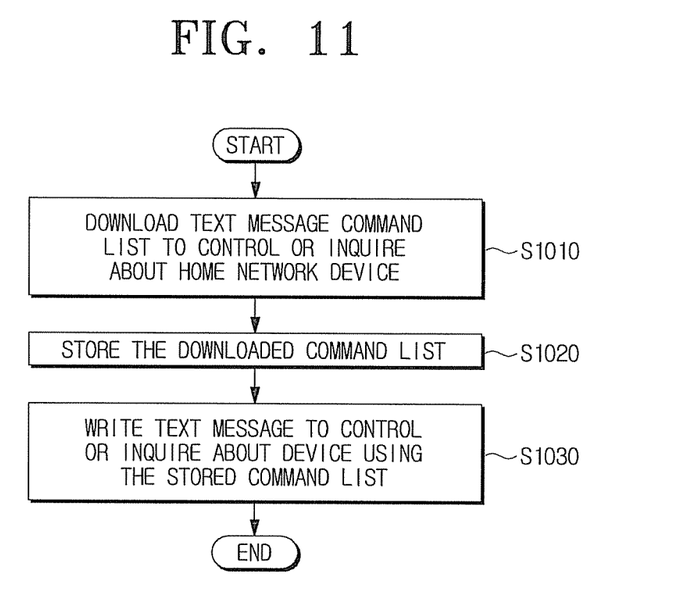
FIG. 11 is a flowchart describing a method of writing a text message in a text message transceiver, according to another embodiment of the present invention.

FIG. 11 is a flowchart describing a method of writing a text message in a text message transceiver according to another embodiment of the present invention. Referring to FIG. 11, first, a text message command list is downloaded in order to control or inquire about a home network device in operation S1010. Then, the downloaded command list is stored in operation S1020. Subsequently, a text message to control or inquire about the home network device 80 using the stored command list is written in operation S1030. According to other aspects, the command list is not stored, but downloaded and displayed each time a user controls or inquires about the home network device. Accordingly, various types of home network devices 80 may be easily controlled.

While aspects of the present invention have been described in relation to text messages, it is understood that voice messages may also be transmitted and analyzed according to aspects of the present invention as described above to control home network devices. Further, other types of messages can be similarly used, such as email.

As described above, according to aspects of the present invention, it is possible to easily control a home network device by writing a message, such as an SMS message, in a text message transceiver. Additionally, a user can readily control various devices connected to the home network through converting a text message according to the home network protocol.

Furthermore, the home network device may be controlled using the SMS message transmitting technique at a lower cost than using the conventional WAP technique. It is also possible to control the home network device using the SMS message transmitting technique in a shorter period of time than using the conventional WAP technique.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A home network service system comprising:
a text message processor to receive a text message including a control signal, the text message being sent from a transceiver having a sender number to a receiver number; and
a home network control apparatus to control a home network device according to the received text message by converting the control signal of the text message to a converted control signal using a protocol compatible with the home network device to be controlled and transmitting the converted control signal to the home network device,
wherein:
the home network control apparatus determines if the receiver number of the text message matches a registered number of the home network control apparatus, transmits the converted control signal to the home network device when the receiver number matches the registered number of the home network control apparatus, and does not transmit the converted control signal to the home network device when the receiver number does not match the registered number of the home network control apparatus, and
the home network control apparatus converts the control signal to correspond to command data matching the control signal of the text message using the protocol compatible with the home network device, the command data being selected from prestored command data.

2. The system as claimed in claim 1, wherein the home network device comprises:
a receiver to receive the converted control signal corresponding to the command data matching the control signal of the text message; and
an operator to perform an operation on the home network device according to the received converted control signal.

3. The system as claimed in claim 1, wherein the home network control apparatus controls the text message processor to send a response to the received text message.

4. The system as claimed in claim 1, wherein the text message processor transmits a text message command list to an external apparatus such that a user prepares the text message, to be transmitted to the text message processor, based on the text message command list.

5. The system as claimed in claim 4, wherein the text message command list comprises a location entry, a device name entry, a key entry, a setting value entry, or combinations thereof such that the user prepares the text message to include a value for each selected entry.

6. The system as claimed in claim 1, wherein the home network control apparatus is at least one of a protocol transformer, a home network server, a short message service (SMS) processing system, and a home gateway.

7. A home network control apparatus to control a home network control device, the home network control apparatus comprising:
a storage unit to store a registered number, and command data to control the home network device, the command data having control signals corresponding to potential text message control signals;
a protocol converter to check the command data in the storage unit for matching command data corresponding to a text message received from an external apparatus, and to convert a control signal of the received text message to a control signal of the matching command data using a protocol compatible with the home network device; and
a communication unit to transmit the converted control signal to the home network device,
wherein the text message is sent from a transceiver having a sender number to a receiver number, the protocol converter converts the control signal when the receiver number and does not convert the control signal when the receiver number does not match the registered number.

8. The apparatus as claimed in claim 7, further comprising a communication unit to transmit the converted control signal to the home network device.

9. The apparatus as claimed in claim 8, wherein the communication unit receives data relating to a status of a control operation performed by the home network device according to the converted control signal, and informs the external apparatus of the status based on the received data.

10. The apparatus as claimed in claim 8, wherein the communication unit transmits a text message command list to the external apparatus such that a user prepares the text message, to be received by the protocol converter, based on the text message command list.

11. A text message transceiver to control a home network device, the text message transceiver comprising:
a program download unit to download a home network control program;
a user interface (UI) provider to provide a UI to control the home network device according to the home network control program; and
a text message generator to generate a text message to control the home network device according to a control command input through the UI,
wherein a number of the text message transceiver is registered in a home network control apparatus and is used to authenticate the text message transceiver.

12. A text message transceiver to control a home network device, the text message transceiver comprising:
- a user interface (UI) provider to provide a UI to receive a user input to control the home network device;
- a text message generator to generate a text message to control the home network device according to the user input; and
- a communication unit to transmit the text message to a home network service system of the home network device, wherein:
- the home network service system converts a control signal of the text message to a converted control signal using a protocol compatible with the home network device, and transmits the converted control signal to the home network device, and
- a number of the text message transceiver is registered in a home network service system and is used to authenticate the text message transceiver.

13. The text message transceiver as claimed in claim 12, wherein the UI provider receives a text message command list and provides the UI according to the text message command list such that a user provides the user input based on the text message command list.

14. A home network service method comprising:
- receiving a text message including a control signal to control a home network device from a text message transceiver, the text message being sent from a sender number to a receiver number;
- converting the control signal of the received text message to a converted control signal using a protocol compatible with the home network device to be controlled; and
- transmitting the converted control signal to the home network device,
- wherein the converting and transmitting is performed when the receiver number matches a registered number and at least one of the converting and transmitting is not performed when the receiver number does not match the registered number.

15. The method as claimed in claim 14, wherein the converting of the control signal comprises:
- converting the control signal to correspond to command data matching the control signal of the text message using the protocol compatible with the home network device, the command data selected from prestored command data.

16. The method as claimed in claim 15, further comprising:
- receiving, in the home network device, the converted control signal corresponding to the command data matching the control signal of the text message; and
- performing an operation on the home network device according to the received control signal.

17. The method as claimed in claim 14, further comprising:
- transmitting a text message command list to the text message transceiver such that a user of the text message transceiver prepares the text message, to be transmitted, based on the text message command list.

18. The method as claimed in claim 14, further comprising:
- receiving, from the home network device, data relating to a status of a control operation performed by the home network device according to the converted control signal; and
- informing the text message transceiver of the status based on the received data.

19. A method of controlling a home network device, the method comprising:
- storing a registered number and command data to control the home network device, the command data having control signals corresponding to potential text message control signals;
- checking the stored command data for matching command data that corresponds to a text message received from an external apparatus, the text message being sent from a sender number to a receiver number;
- converting a control signal of the received text message to a control signal of the matching command data using a protocol compatible with the home network device; and
- transmitting the converted control signal to the home network device,
- wherein the converting and transmitting is performed when the receiver number matches the stored registered number and at least one of the converting and transmitting is not performed when the receiver number does not match the stored registered number.

20. The method as claimed in claim 19, further comprising:
- transmitting the converted control signal to the home network device.

21. A method of controlling a home network device with a text message transceiver, the method comprising:
- downloading a home network control program to the text message transceiver;
- providing a user interface (UI) to control the home network device according to the home network control program; and
- generating a text message to control the home network device according to a control command input through the UI.

22. The method as claimed in claim 21, further comprising:
- transmitting the generated text message to a home network control apparatus that is connected to the home network device.

23. A method of controlling a home network device with a text message transceiver, the method comprising:
- receiving a user input in the text message transceiver to control the home network device, the text message being sent from a sender number to a receiver number;
- generating a text message according to the user input;
- transmitting the generated text message to a home network control apparatus;
- converting a control signal of the text message to a converted control signal using a protocol compatible with the home network device to be controlled; and
- transmitting the converted control signal to the home network device,
- wherein the converting and transmitting occur when the receiver number matches a stored registered number and at least one of the converting and transmitting does not occur when the receiver number does not match the stored registered number.

24. A system for controlling a home network device with a text message, the system comprising:
- a text message transceiver comprising:
  - a user interface (UI) provider to provide a UI to receive a user input to control the home network device,
  - a text message generator to generate a text message to control the home network device according to the user input, and
  - a communication unit to transmit the text message, the text message being sent from a sender number to a receiver number; and
- a home network service system connected to the home network device, the home network service system comprising:

a text message processor to receive the text message, and a home network control apparatus to control the home network device according to the text message by converting a control signal of the text message to a converted control signal using a protocol compatible with the home network device to be controlled and transmitting the converted control signal to the home network device, wherein the home network control apparatus performs the converting and the transmitting when the receiver number matches a stored registered number and does not perform at least one of the converting and transmitting when the receiver number does not match the stored registered number.

* * * * *